United States Patent
Namikawa et al.

(10) Patent No.: US 7,456,546 B2
(45) Date of Patent: Nov. 25, 2008

(54) DRIVE UNIT

(75) Inventors: Taketo Namikawa, Kyoto (JP);
Tomoyuki Yuasa, Sakai (JP); Haruyuki Nakano, Sakai (JP); Yasuhiro Okamoto, Tondabayashi (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 118 days.

(21) Appl. No.: 11/503,480

(22) Filed: Aug. 11, 2006

(65) Prior Publication Data

US 2007/0040479 A1  Feb. 22, 2007

(30) Foreign Application Priority Data

Aug. 16, 2005  (JP) .............................. 2005-235825

(51) Int. Cl.
*H01L 41/09*  (2006.01)
(52) U.S. Cl. ...................... 310/317; 310/328
(58) Field of Classification Search ................. 310/317, 310/328
See application file for complete search history.

(56) References Cited

U.S. PATENT DOCUMENTS

| 5,786,654 | A  | * | 7/1998  | Yoshida et al. ............. 310/328 |
| 6,016,231 | A  |   | 1/2000  | Kanbara et al. ............. 359/824 |
| 6,433,459 | B1 | * | 8/2002  | Okada ........................ 310/317 |
| 2005/0242685 | A1 |   | 11/2005 | Yuasa ......................... 310/317 |
| 2005/0275315 | A1 |   | 12/2005 | Manabe et al. .............. 310/328 |

FOREIGN PATENT DOCUMENTS

JP  11-98865 A  4/1999

* cited by examiner

*Primary Examiner*—J. San Martin
*Assistant Examiner*—Derek J Rosenau
(74) *Attorney, Agent, or Firm*—Sidley Austin LLP (57) ABSTRACT

A drive unit being characterized in that a movable object can be prevented from being tilted when the movable object is stopped using a restricting member. The drive unit comprises a piezoelectric element; a rod provided at an end of the piezoelectric element; a movable object, which is frictionally engaged with the rod and the movable range of which is restricted using the restricting members; and drive pulse generating means for applying drive signals to the piezoelectric element, wherein the drive pulse generating means apply a first wave drive signal for vibrating the rod so that the movable object moves toward the restricting member when the movable object is moved to a position where the movable object is close to the restricting member, and temporarily apply a second wave drive signal for vibrating the rod so that the movable object is moved in a direction of movement away from the restricting member after the movable object is made contact with the restricting member, and then stop the application of the drive signal.

17 Claims, 9 Drawing Sheets

D=0.4

DRIVE UNIT

BACKGROUND OF THE INVENTION

The present invention relates to a drive unit for driving a movable object incorporating mainly an optical component, such as a lens being used in a camera, a DVD drive, a CD drive, an MD drive, an endoscope or the like.

Figures 1A, 1B:
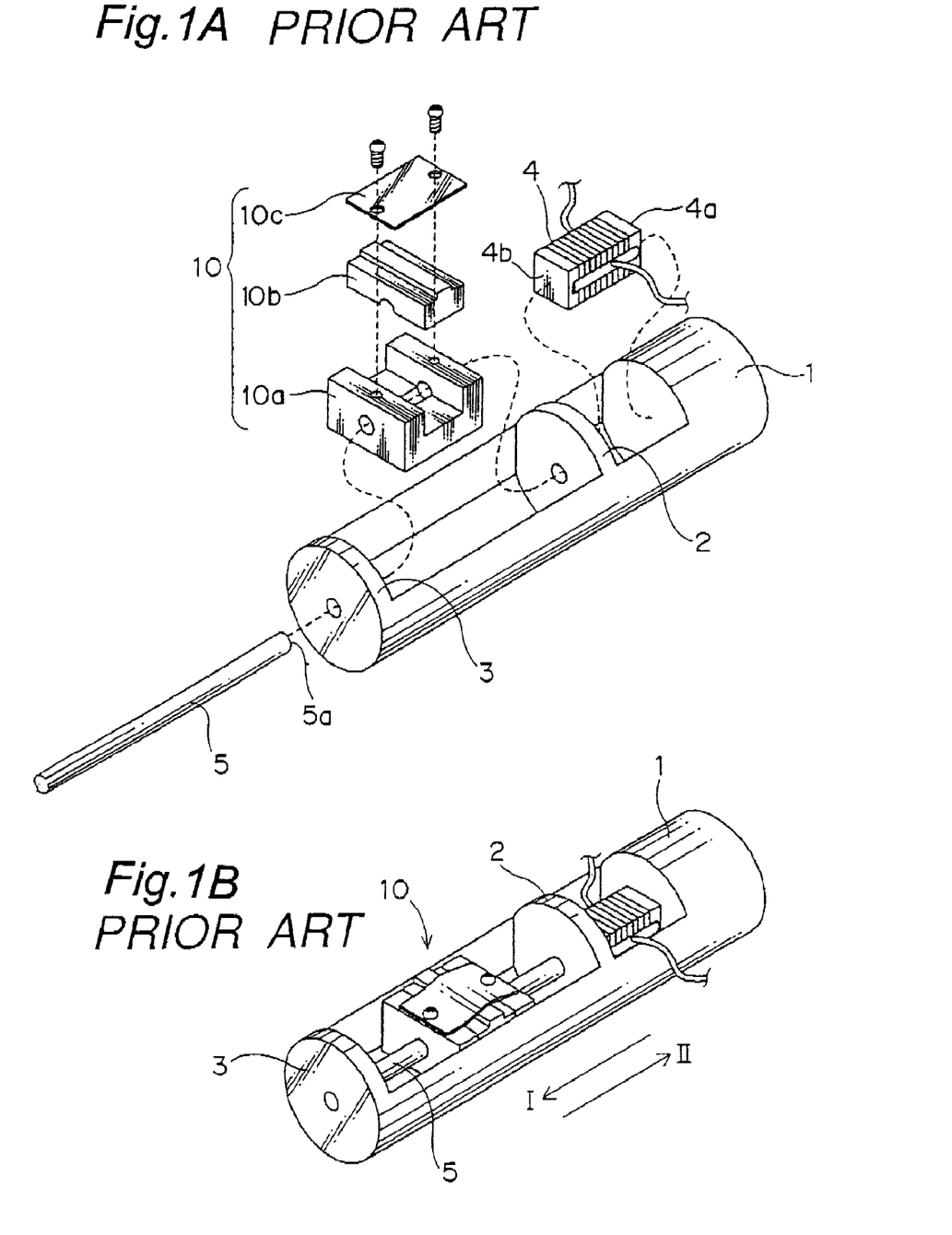
FIG. 1A is an exploded perspective view showing a conventional drive unit.
FIG. 1B is an assembly drawing showing the conventional drive unit.

As a drive unit that uses an electromechanical transducer, such as a piezoelectric element, which changes its dimension (expands or contracts) when a voltage is applied, the drive unit shown in an exploded perspective view in FIG. 1A and in an assembled perspective view in FIG. 1B, for example, is known (U.S. Pat. No. 6,016,231).

A piezoelectric element 4 comprises multiple piezoelectric plates stacked. One end 4a thereof in the expansion/contraction direction is secured to a base 1, and the other end 4b thereof is secured to the first end 5a of a rod (supporting member) 5. The rod 5 is slidably supported on supporting sections 2 and 3 integrated with the base 1.

The rod 5 is held between the main unit 10a and the cap 10b of a movable object 10, and a hold-down spring 10c exerts an urging force to the main unit 10a and the cap 10b in the holding direction. The movable object 10 is thus supported so as to be slidable along the rod 5.

A voltage control circuit is connected to the piezoelectric element 4. For example, when a predetermined drive voltage having a rectangular waveform or the like is applied to the piezoelectric element 4, the piezoelectric element 4 vibrates with a displacement, the shape of which is nearly the same as that of the drive voltage. Because the rod 5 is flexible, the rod 5 vibrates with a displacement having a sawtooth shape in the direction of its length in response to the displacement of the piezoelectric element 4 (see FIG. 2).

More specifically, in period A, the piezoelectric element 4 expands relatively slowly in the gradually rising inclined section 101 of a first vibration displacement 100, and the rod 5 moves slowly in the direction indicated by arrow I shown in FIG. 1B. Next, in period B, the piezoelectric element 4 contracts abruptly and its length returns to its initial length (as shown by the waveform section indicated by the falling inclined section 102).

The rod 5 thus moves abruptly in the direction indicated by arrow II.

Movements similar to those described above are repeated hereafter. As a result, the rod 5 repeats the slow movement in direction I and the abrupt movement in direction II, thereby vibrates. Hence, the rod 5 vibrates with a displacement having a sawtooth vibration waveform characterized by a gradual rise and a rapid fall as shown in FIG. 2.

Figure 3:
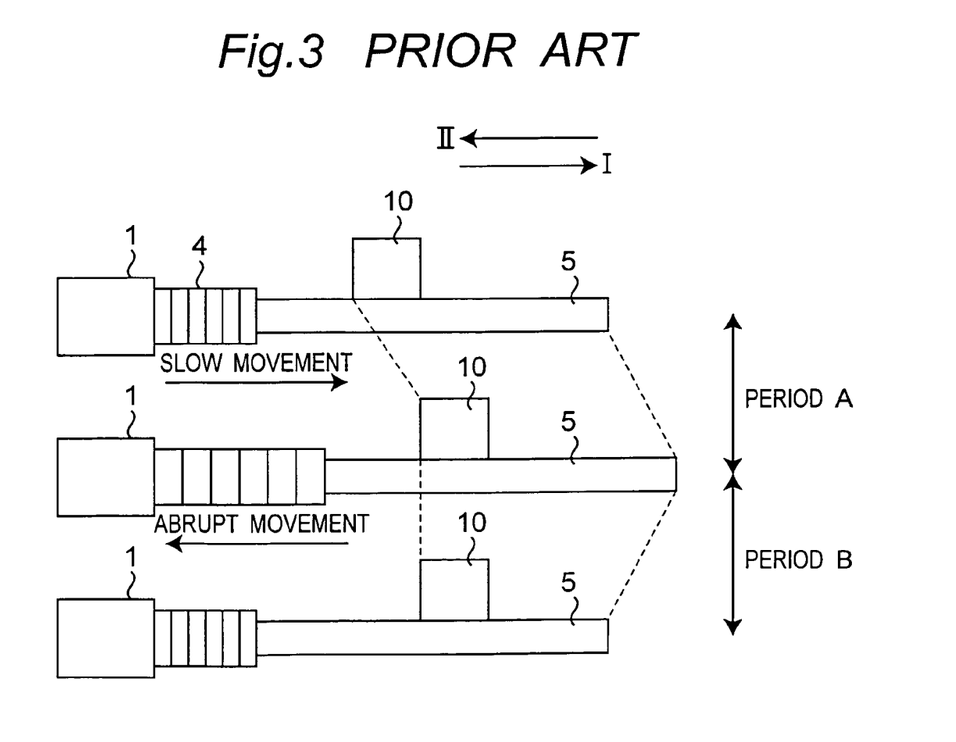
FIG. 3 is a view illustrating a driving principle of the drive unit shown in FIG. 1.

The spring force of the hold-down spring 10c of the movable object 10 (the frictional connection force applied from the movable object 10 to the rod 5) is adjusted so that the movable object 10 moves together with the rod 5 when the rod 5 moves slowly (in period A), and so that the movable object 10 stays where it is due to inertia (or moves by an amount smaller than that of the rod 5) when the rod 5 moves abruptly (in period B), as shown in FIG. 3. Hence, the movable object 10 moves in direction I relatively with respect to the base 1 while the rod 5 vibrates.

Figure 2:
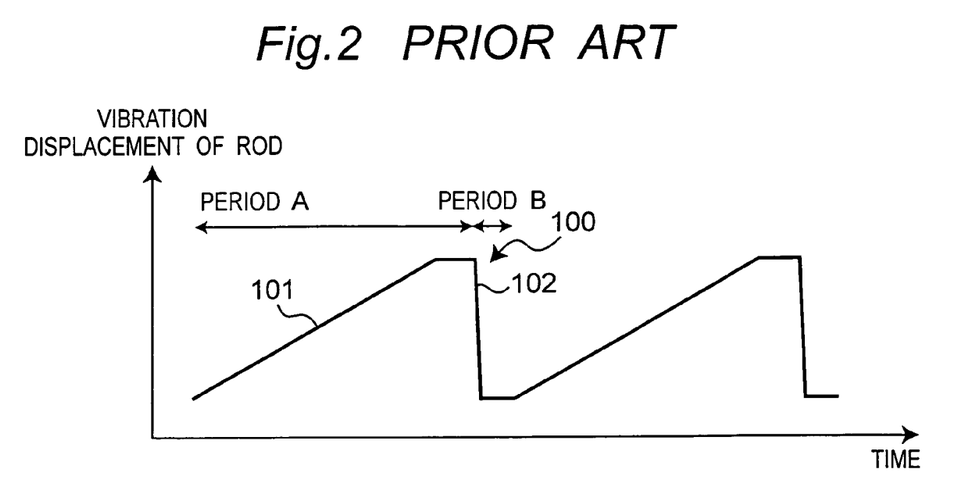
FIG. 2 is a view showing a vibration displacement of a rod of the drive unit shown in FIG. 1.

In the case that the movable object 10 is moved in the direction indicated by arrow II shown in FIG. 1B, the vibration waveform of the rod 5 may be the reverse of that shown in FIG. 2, that is, a waveform having a rapidly rising section and a gradually falling section. The movement principle of the movable object 10 in this case is similar to that of the above-mentioned case. In this case, the vibration displacement of the rod can be reversed from that shown in FIG. 2 by changing the duty ratio of the rectangular wave applied to the piezoelectric element 4.

The movable object 10 of the drive unit can be moved relatively with respect to the base (stationary base) 1. Hence, the drive unit can be used as the lens drive unit of a camera, for example. In other words, with a configuration in which the movable object 10 is connected to a lens frame, the lens can be moved simultaneously with the movement of the movable object 10.

Figure 4A:
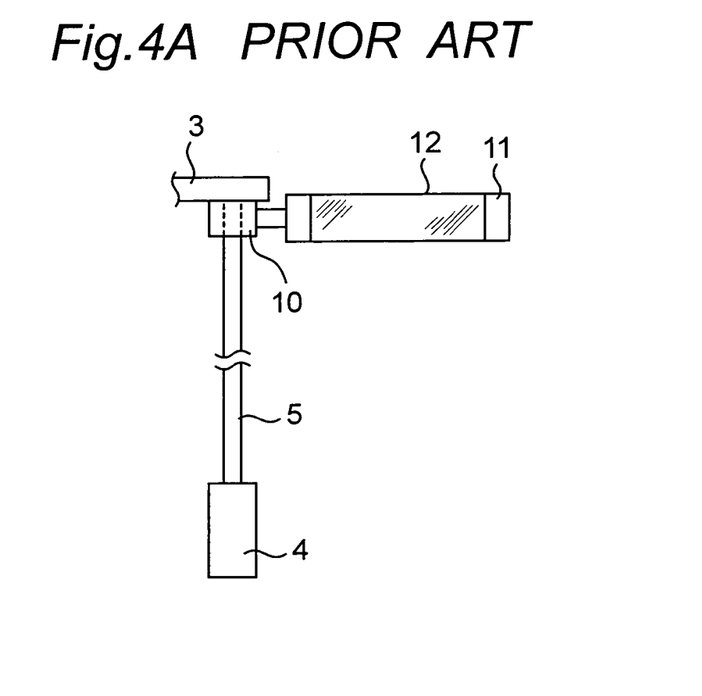
FIG. 4A is a view illustrating a method for detecting an origin of the movable object of the drive unit shown in FIG. 1.

In the case that the drive unit that uses such a piezoelectric element having the movement principle described above is used to move an optical member, the positional control of the movable object 10 becomes important. In the positional control of the movable object 10, the position of the movable object 10 may be detected at all times so that the movable object 10 can be stopped accurately at a position immediately before the end of the movable range. However, it is difficult to accurately carry out positional control for the drive unit that uses such a piezoelectric element. Hence, the supporting section 3 that supports the rod is used as a restricting member that restricts the movement range of the movable object, and the movable object is securely made contact with the supporting section 3 that restricts the movement of the movable object (see FIG. 4A).

Figure 4B:
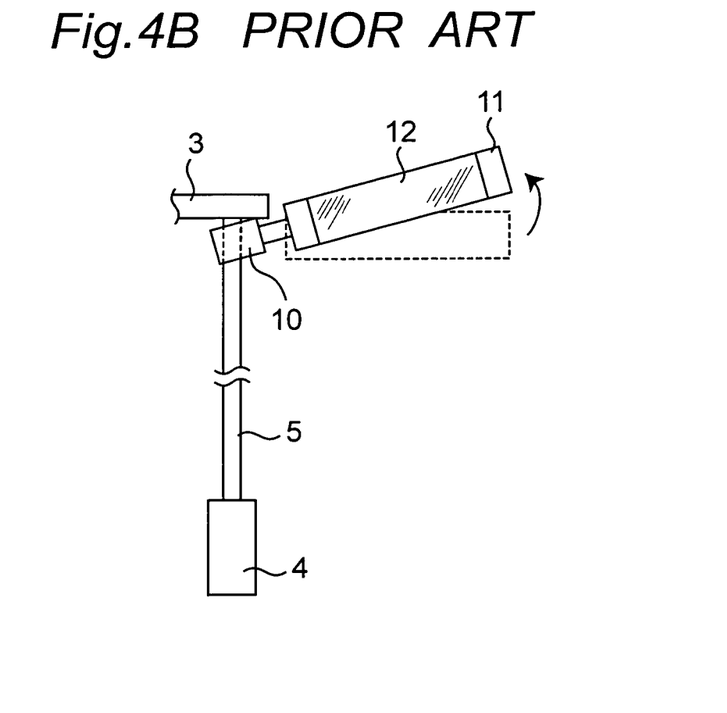
FIG. 4B is a view showing a state in which the movable object of the drive unit shown in FIG. 1 is tilted.

However, in the case that the movable object makes contact with the restricting member (the supporting section 3) and stopped, if the driving of the piezoelectric element is not stopped immediately after the movable object makes contact with the restricting member, there is a problem in which the movable object is tilted as shown in FIG. 4B. In other words, in the case of a drive unit that is actually used in the lens barrel of a camera or the like, the diameter of the rod is appropriately 1 mm, but the diameter of the lens frame 11 connected to the movable object is appropriately 10 mm. Hence, the sizes and weights of the members extending from the movable object are larger than those of the movable object. For this reason, if the state in which the movement of the movable object 10 is restricted using the restricting member 3 continues while the piezoelectric element 4 is driven to move the movable object 10, the movable object 10 is apt to be tilted. Although the tilting of the movable object is very slight, in the case of the drive unit connected to an optical member, such as a lens 12, the tilting becomes a cause of significant deterioration in the performance of the optical system.

For the purpose of solving this problem, the restricting member is made larger or a sensor capable of accurately detecting the position of the movable object is provided, whereby it is possible to prevent the tilting of the movable object. However, such a configuration in which the restricting member is made larger and a sensor is provided is not desirable from the viewpoint of downsizing the optical system, such as a lens barrel, in recent years. Furthermore, providing a sensor causes a problem of increasing cost.

Accordingly, for the purpose of solving the technical problem described above, the present invention is intended to provide a drive unit capable of preventing the tilting of the movable object thereof in the case that the movable object is stopped at the position where the movable object makes contact with the restricting member.

SUMMARY OF THE INVENTION

For the purpose of solving the technical problem described above, the present invention provides a drive unit configured as described below.

A first aspect of the present invention provides a drive unit comprising:

an electromechanical transducer capable of expanding/contracting by drive signal application, a supporting member that is connected to the electromechanical transducer and displaced together with the electromechanical transducer, a movable object that is slidably supported on the supporting member and moves along the supporting member owing to a vibration of the supporting member by virtue of the expansion/contraction of the electromechanical transducer, restricting member that restricts a movable range of the movable object, and a drive circuit that applies to the electromechanical transducer a first wave drive signal for vibrating the supporting member so that a difference occurs between the expansion and contraction of the supporting member when the movable object is moved to a position where the movable object makes contact with the restricting member, and applies to the electromechanical transducer a second wave drive signal for vibrating the supporting member so that the movable object is moved in a direction of movement away from the restricting member to the extent that the movable object is not detached from the restricting member after the movable object makes contact with the restricting member, and then stops the applications of the drive signals.

In the configuration described above, the drive circuit may apply the first wave drive signal for a constant time sufficient to allow the movable object to make contact with the restricting member, regardless of the position of the movable object before the start of the movement.

In addition, the second wave drive signal may be applied for 1 to 10 msec, for example.

Furthermore, the second wave drive signal may be a drive signal that moves the movable object at a speed lower than the movement speed of the movable object obtained applying the first wave drive signal. Moreover, the second wave drive signal may be a drive signal that moves the movable object at the same speed as a movement speed of the movable object obtained applying the first wave drive signal.

It is preferable that the restricting member may be provided at a reference position, on the basis of which a position of the movable object of the drive unit is detected.

A second aspect of the present invention provides a drive unit comprising:

an electromechanical transducer capable of expanding/contracting by drive signal application, a supporting member that is secured to an end of the electromechanical transducer in the expansion/contraction direction thereof, a movable object slidably supported on the supporting member, an urging member that exerts an urging force to urge the movable object toward the supporting member, a restricting member provided to make contact with the movable object at an end of a movable range of the movable object, and a drive circuit that applies to the electromechanical transducer a first wave drive signal for vibrating the supporting member so that the movable object moves toward the restricting member when the movable object is moved to a position where the movable object makes contact with the restricting member, and applies to the electromechanical transducer a second wave drive signal for vibrating the supporting member so that the movable object is moved in a direction of movement away from the restricting member to the extent that the movable object is not detached from the restricting member after the movable object is made makes contact with the restricting member, and then stops the applications of the drive signals.

In the configuration described above, it is preferable that the drive circuit may apply the first wave drive signal for a constant time sufficient to allow the movable object to make contact with the restricting member, regardless of a position of the movable object before start of the movement.

Furthermore, the second wave drive signal may be a drive signal that moves the movable object at a speed lower than a movement speed of the movable object obtained applying the first wave drive signal. Moreover, the second wave drive signal may be a drive signal that moves the movable object at the same speed as the movement speed of the movable object obtained applying the first wave drive signal.

Still further, it is preferable that the restricting members may each be provided at a reference position, on the basis of which a position of the movable object of the drive unit is detected.

In addition, it may also be possible that, after the second wave drive signal is applied to the electromechanical transducer, the drive circuit applies a third wave drive signal for vibrating the supporting member so that the movable object moves toward the restricting member, and then stops the application of the drive signal. Furthermore, at this time, it is preferable that the time during which the third wave drive signal is applied may be shorter than the time during which the second wave drive signal is applied.

With the present invention, in the case that the movable object is stopped at the position where the movable object is made contact with the restricting member, the tilting of the movable object owing to the contact of the movable object with the restricting member can be corrected. In other words, the tilting of the movable object, caused when the movable object makes contact with the restricting member, can be corrected by vibrating the supporting member so that the movable object is not moved substantially after the movable object is made contact with the restricting member. Hence, the movable object can be positioned without using a sensor or the like. Furthermore, the displacement of the optical axis due to the displacement of the optical member provided in the movable object can be prevented. In the present invention, the state in which the movable object is in "contact" with the restricting member means that the movable object is substantially in close contact with the restricting member. This contact state includes the state in which the movable object is in contact with the restricting member without any clearance as a matter of course, and also includes the state in which a very slight clearance occurs between the movable object and the restricting member when the second wave drive signal is applied.

Furthermore, because the first wave drive signal is applied for a constant time sufficient to allow the movable object to make contact with the restricting member, regardless of the position of the movable object before the start of the movement, the movable object can be securely made contact with the restricting member, regardless of the position of the movable object before the start of the movement. Therefore, it is not necessary to provide a sensor or the like for detecting the position of the movable object, whereby the drive unit can be downsized and the cost can be reduced.

Moreover, because the application time of the second wave drive signal is set to appropriately 1 to 10 msec, the movement amount of the movable object from the restricting member can be made very small. Therefore, the tilting of the movable object can be corrected while the movable object is in contact with or very close to the restricting member.

With a configuration in which the second wave drive signal is used as a drive signal that moves the movable object at a speed lower than the movement speed of the movable object obtained applying the first wave drive signal, the movement speed of the movable object from the restricting member, obtained applying the second wave drive signal that is applied after the movable object made contact with the restricting member to move the movable object in a direction of movement away from the restricting member, is made lower. Therefore, the tilting of the movable object can be corrected while the movable object is in contact with or very close to the restricting member.

Furthermore, in the case that the speed of the movable object obtained applying the first wave drive signal is made equal to the speed of the movable object obtained applying the second wave drive signal, the control for drive signal switching can be simplified.

Moreover, in the case that the position of the movable object detected using the restricting member is used as a reference position, the position can be detected accurately, whereby the position of the movable object can be detected easily.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings. A drive unit according to an embodiment of the present invention will be described below referring to the drawings.

Figure 5A:
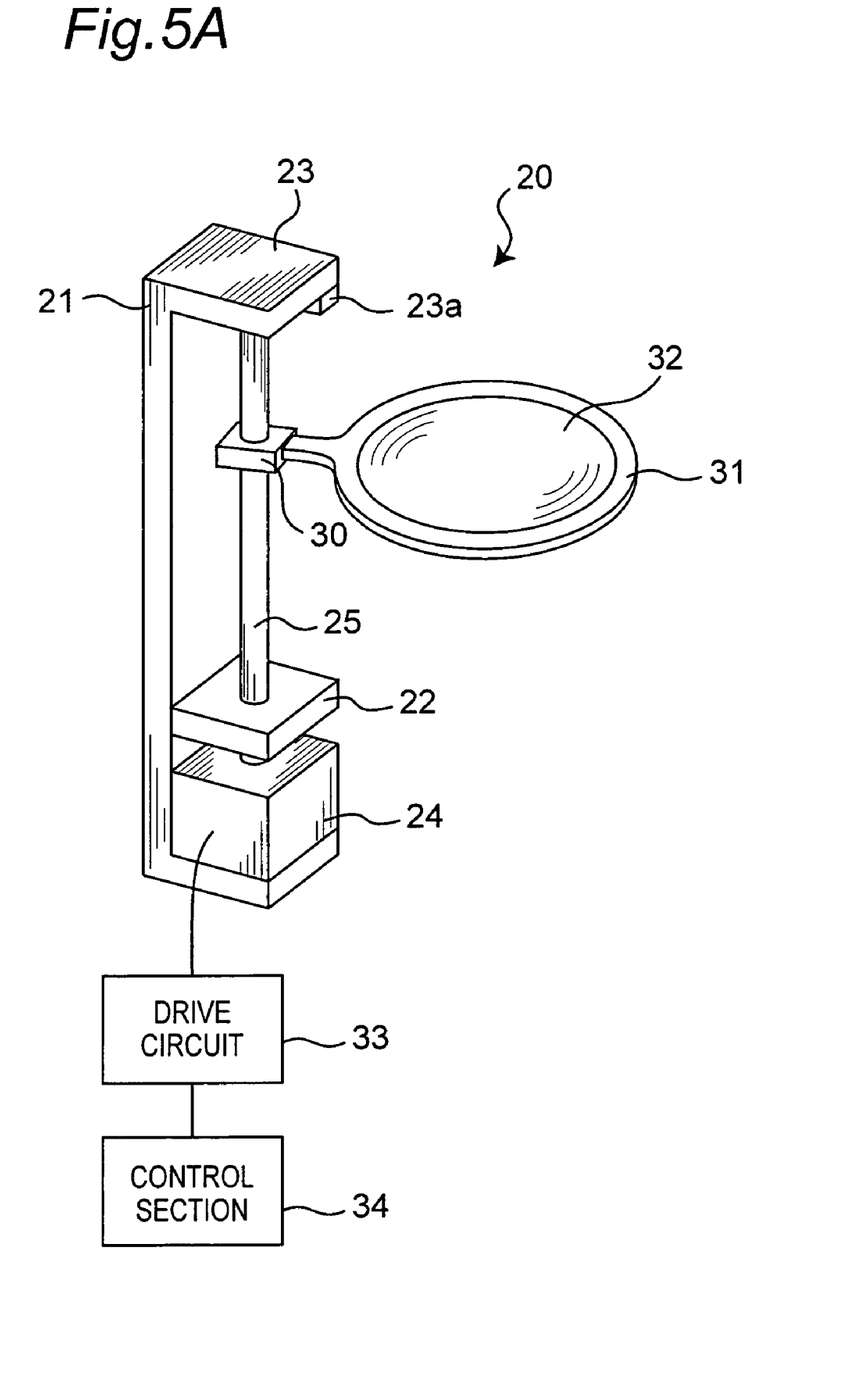
FIG. 5A is an external configurational view showing a drive unit according to an embodiment of the present invention.
Figure 5B:
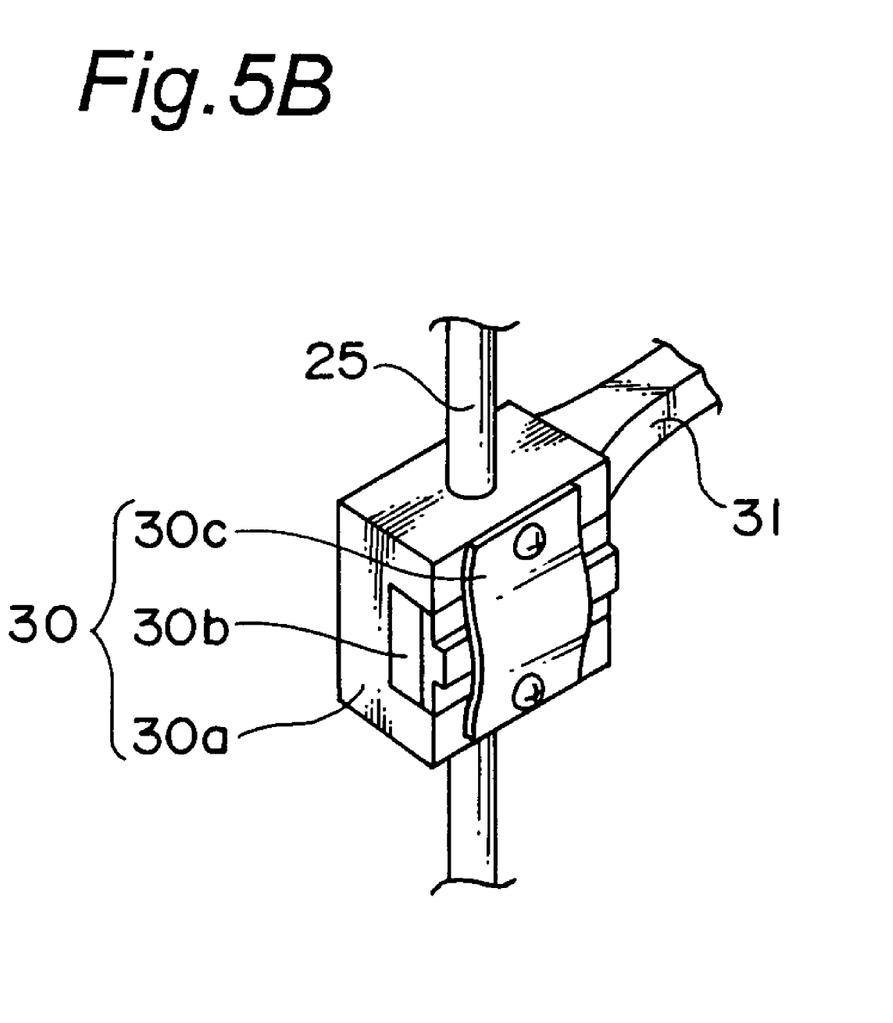
FIG. 5B is an enlarged view showing the moving object shown in FIG. 5A.

FIG. 5A is a schematic view showing a configuration of a drive unit according to this embodiment of the present invention. The drive unit 20 according to this embodiment is used to drive a lens frame 31 in which an optical lens 32 being used in a lens barrel of a camera is provided. The optical lens 32 driven using the drive unit is used as a zoom lens in the lens barrel of a camera to adjust the focal length of the camera when driven in its movable range. In this lens barrel, one end of the movable range is a tele-position where the focus of the lens barrel is the longest, and the other end is a macro-position where the focus of the lens barrel is the shortest.

The drive unit 20 drives a movable object 30 on the basis of the same principle as that of the drive unit that uses a piezoelectric element 4 shown in FIG. 1. The piezoelectric element 24 of the drive unit 20 comprises multiple piezoelectric plates stacked. One end thereof in an expansion/contraction direction is secured to a frame 21, and the other end thereof is secured to an end of a rod 25. The rod 25 is slidably supported on supporting sections 22 and 23 integrated with the frame 21. The rod 25 is held between the main unit 30a and the cap 30b of a movable object 30, and a hold-down spring 30c exerts an urging force to the main unit 30a and the cap 30b in the holding direction. The movable object 30 is thus supported so as to be slidable along the rod 25.

For example, the rod 25 is held between the main unit 30a and the cap 30b of the movable object 30, and a hold-down spring 30c exerts an urging force to the main unit 30a and the cap 30b in the holding direction to achieve frictional connection between the rod 25 and movable object 30. The movable object 30 is thus supported so as to be slidable along the rod 25. The lens frame 31 is secured to the movable object 30 and is moved simultaneously with the movement of the movable object. Because the movable object 30 is urged toward the rod 25 by hold-down spring, when the movable object 30 is tilted with respect to the rod 25, a force is exerted to correct the tilting of the movable object 30.

A drive circuit 33 is connected to the piezoelectric element 24. Under the control from a control section 34, the drive circuit 33 applies a rectangular wave drive voltage having a predetermined duty ratio to the piezoelectric element 24. In other words, the control section 34 controls the drive circuit 33 to apply a rectangular wave drive voltage having a predetermined duty ratio depending on the direction and speed of the movement of the movable object 30, thereby adjusting the position of the movable object 30.

The movable object 30 moves along the rod as the piezoelectric element 24 expands and contracts by drive signal application. The movable range of the movable object 30 is between the two supporting sections 22 and 23. In other words, the rod 25 is required to be configured so that its length is larger than the movable range, and the size of the rod 25 is designed depending on the movable range of the movable object 30. In addition, the position where the movable object 30 makes contact with the supporting section 22 is used as the origin for positional control. In other words, in the positional control of the movable object 30, the origin that is used to detect the position of the movable object 30 can be detected by making the movable object 30 come into contact with the supporting section 22. With a configuration in which the supporting sections 22 and 23 are made sufficiently larger than the movable object, the movement of the movable object 30 can be restricted without causing the tilting of the movable object 30 during origin detection described later. However, in this embodiment, the supporting sections are made small so that the drive unit is configured to be small in size.

A sensor 23a, provided at the end of the movable range on the side of the supporting section 23, detects that the movable object 30 makes contact with the supporting section 23. The output of the sensor 23a is input to the control section 34.

Figure 6:
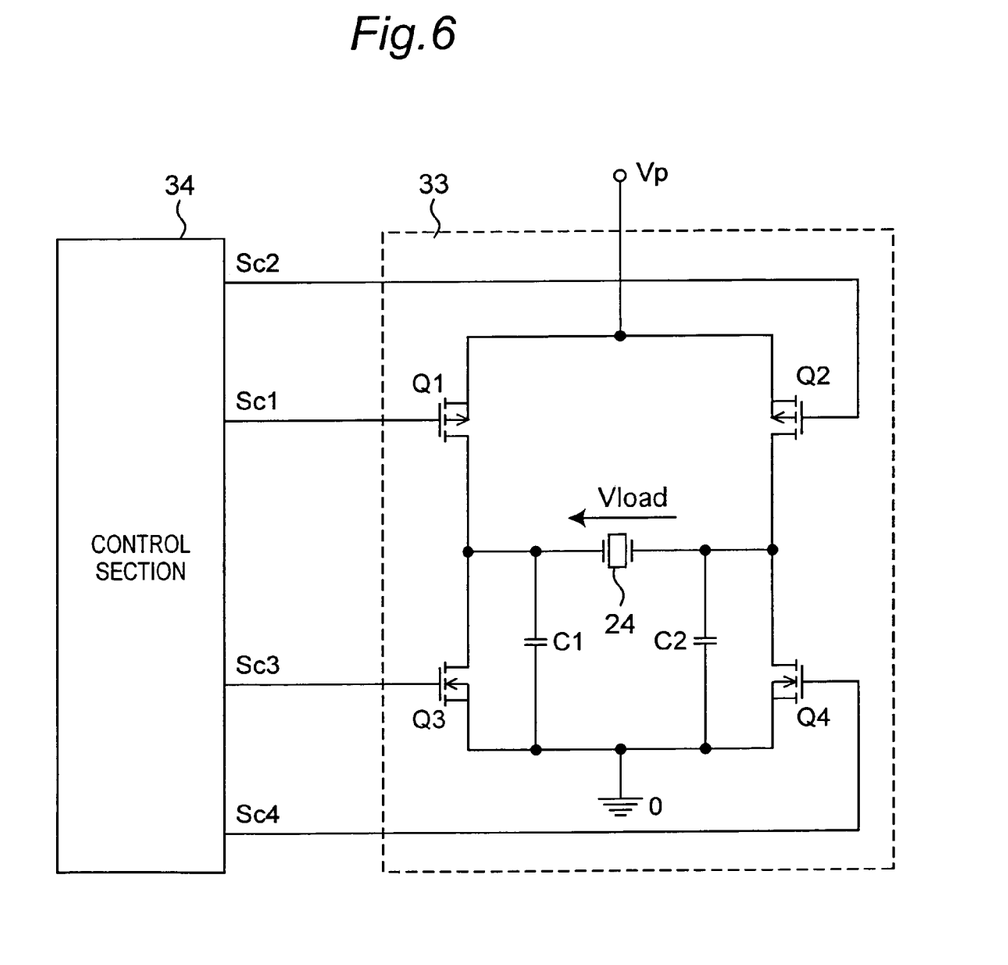
FIG. 6 is a view showing a configuration of a drive circuit and a control section of the drive unit shown in FIG. 5A.

FIG. 6 shows a configuration example of the drive circuit 33 that is included in the drive unit shown in FIG. 5A and applies a voltage to the piezoelectric element. In the drive circuit 33, four switches Q1 to Q4 and two capacitors C1 and C2 form an H-bridge circuit, and the drive circuit 33 applies a drive voltage to the piezoelectric element 24. The switches Q1 and Q2 are formed of P-channel MOS FETs, and the switches Q3 and Q4 are formed of N-channel MOS FETs.

The source of the switch Q1 is connected to a terminal Vp, and the gate thereof is connected to the terminal Sc1 of the control section 34. The source of the switch Q2 is connected to the terminal Vp, and the gate thereof is connected to the terminal Sc2 of the control section. The drain of the switch Q3 is connected to the drain of the switch Q1, and the source thereof is grounded. In addition, the gate of the switch Q3 is connected to the terminal Sc3 of the control section 34. The drain of the switch Q4 is connected to the drain of the switch Q2, and the source thereof is grounded. Furthermore, the gate of the switch Q4 is connected to the terminal Sc4 of the control section 34.

One terminal of the piezoelectric element 24 is connected to the drains of the switches Q1 and Q3, and the other terminal thereof is connected to the drains of the switches Q2 and Q4. In addition, the capacitors C1 and C2 are connected in parallel with the switches Q3 and Q4, respectively, as shown in FIG. 6. The capacitance of each of the capacitors C1 and C2 is equal to the capacitance of the piezoelectric element 24. The control section 34 switches voltages to be input to the switches Q1 to Q4, thereby controlling the voltages to be applied to the piezoelectric element 24. More specifically, for example, when a voltage (high) is applied to the switches Q1 and Q3 and when no voltage (low) is applied to the switches Q2 and Q4, voltage −Vp is applied to the piezoelectric element. On the other hand, when no voltage (low) is applied to the switches Q1 and Q3 and when a voltage (high) is applied to the switches Q2 and Q4, voltage Vp is applied to the piezoelectric element 24.

Figure 7:
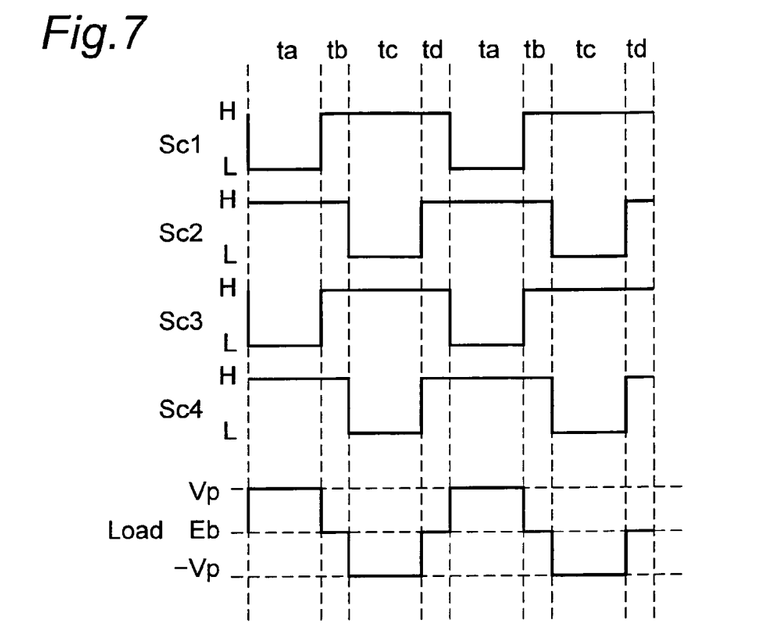
FIG. 7 is a view showing control signals applied to the drive circuit shown in FIG. 6 and voltages applied to a piezoelectric element of the drive unit.

The control section 34 turns ON/OFF the voltages applied to the drains of the switches Q1 to Q4 as described above, thereby controlling the voltage to be applied to the piezoelectric element 24 and inputting a rectangular wave drive voltage to the piezoelectric element 24 via the drive circuit 33. More specifically, when the gate voltages of the switches Q1 to Q4 are controlled as shown in FIG. 7, the drive voltage to be applied to the piezoelectric element 24 has a rectangular waveform shown by Load in FIG. 7. As understood from FIG. 7, ta to td respectively designate voltage application time periods, and these time periods ta to td form one cycle.

First, in the time period ta, the switches Q2 and Q4 become high, and the switches Q1 and Q3 become low. On the other hand, in the time period tc, the switches Q2 and Q4 become low, and the switches Q1 and Q3 become high. Hence, the voltage applied to the piezoelectric element 24 in the time period ta and the voltage applied thereto in the time period tc are equal in absolute value, but opposite in sign.

In the time periods tb and td, because all the switches Q1 to Q4 become high, the voltage applied to the piezoelectric element 24 is zero. Hence, when the cycle from ta to td is repeated, the rectangular wave drive voltage shown in FIG. 7 is applied periodically to the piezoelectric element 24. During the time periods tb and td, the shape of the piezoelectric element 24, having been changed, is returned to its original shape. The time periods tb and td are significantly shorter than the time periods ta and tc, and the time periods tb and td can be set to zero. The ratio between the time periods ta and tc only are adjusted to change the duty ratio of the drive voltage.

Figure 8:
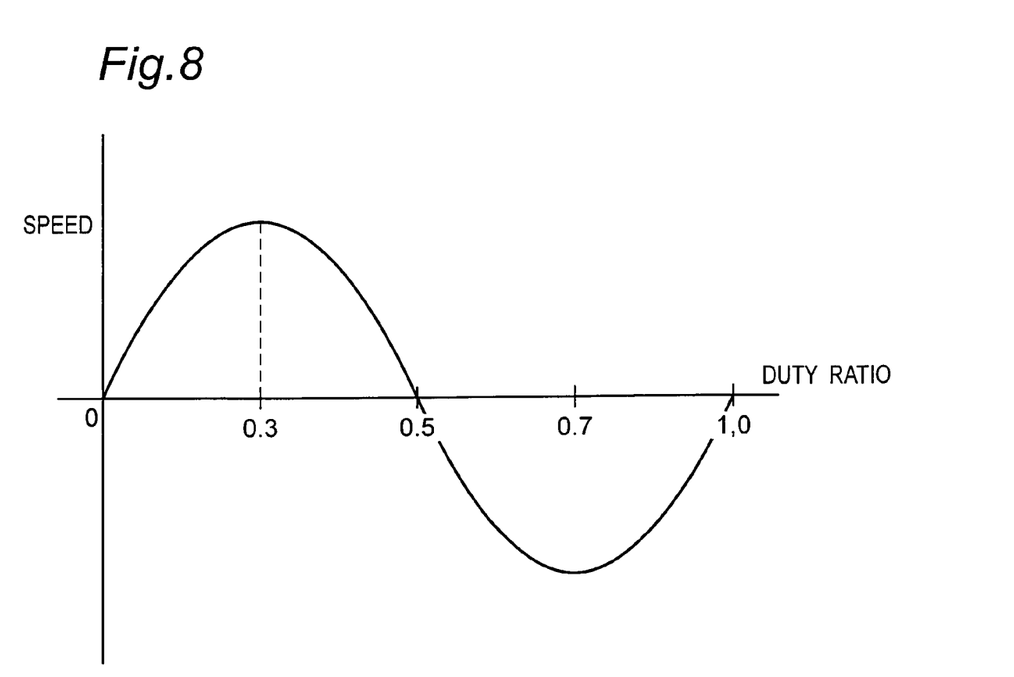
FIG. 8 is a graph showing an example of a relationship between a duty ratio of the drive voltage and a relative movement speed of the movable object.

FIG. 8 shows an example of the relationship between the duty ratio and the movement speed of the movable object 30. As the duty ratio increases from zero, the movement speed of the movable object 30 increases in the positive direction, and reaches the positive maximum value when the duty ratio is 0.3. Furthermore, as the duty ratio exceeds 0.3, the speed lowers gradually, and reaches zero when the duty ratio is 0.5. At this time, the expansion and contraction speeds of the rod 25 are equal, and the movable object has room for movement microscopically. However, because the movement amounts during expansion and contraction are the same, the movable object is in a state in which its speed is zero, relatively. In addition, as the duty ratio becomes larger than 0.5, the movement speed of the movable object increases in the negative direction, and reaches the negative maximum value when the duty ratio is 0.7. Furthermore, as the duty ratio exceeds 0.7, the negative speed lowers gradually, and the movable object stops when the duty ratio is 1.0. In this embodiment, the positive direction is a direction in which the movable object 30 is moved toward the supporting section 22, and the negative direction is a direction in which the movable object 30 is moved toward the supporting section 23.

Next, the drive control of the drive unit according to this embodiment will be described below. As described above, the drive unit moves the movable object 30 along the rod 25 in a desired direction by applying the rectangular wave drive voltage having a predetermined duty ratio determined using the control section 34. For the purpose of moving the movable object 30 at high speed, it is preferable that the duty ratio of the drive voltage at this time may be appropriately 0.3 or 0.7. In other words, when the duty ratio is 0.3, the movable object 30 moves at high speed toward the supporting section 22, and when the duty ratio is 0.7, the movable object 30 moves at high speed toward the supporting section 23.

If the drive voltage is applied to the piezoelectric element 24 when the movable object 30 has moved to an end of its movable range, that is, when the movable object 30 is in contact with the supporting section 22 or 23, the movable object 30 is tilted. The drive unit according to this embodiment carries out the following control to prevent or eliminate the tilting.

The sensor 23a carries out positional detection when the movable object 30 makes contact with the end of the movable range on the tip side of the drive unit, that is, the supporting section 23. In other words, when the sensor 23a detects that the movable object 30 has made contact with the supporting section 23, the application of the drive voltage to the piezoelectric element 24 is stopped. As a result, the drive voltage is not applied when the movable object 30 is in contact with the supporting section 23, whereby the tilting of the movable object 30 is prevented.

On the other hand, when the movable object 30 makes contact with the end of the movable range on an element side of the drive unit, that is, the supporting section 22, the following processing is carried out. The limit position of the movable range, restricted using the supporting section 22 as described above, is used as the origin for the positional control of the movable object 30, and serves as the standby position of the movable object 30. In other words, when the power supply of a camera incorporating the drive unit is turned OFF or when the power supply is turned ON and the state of the camera is reset, the movable object 30 is controlled so as to make contact with the supporting section 22 on the element side, and origin detection is carried out.

Figure 9:
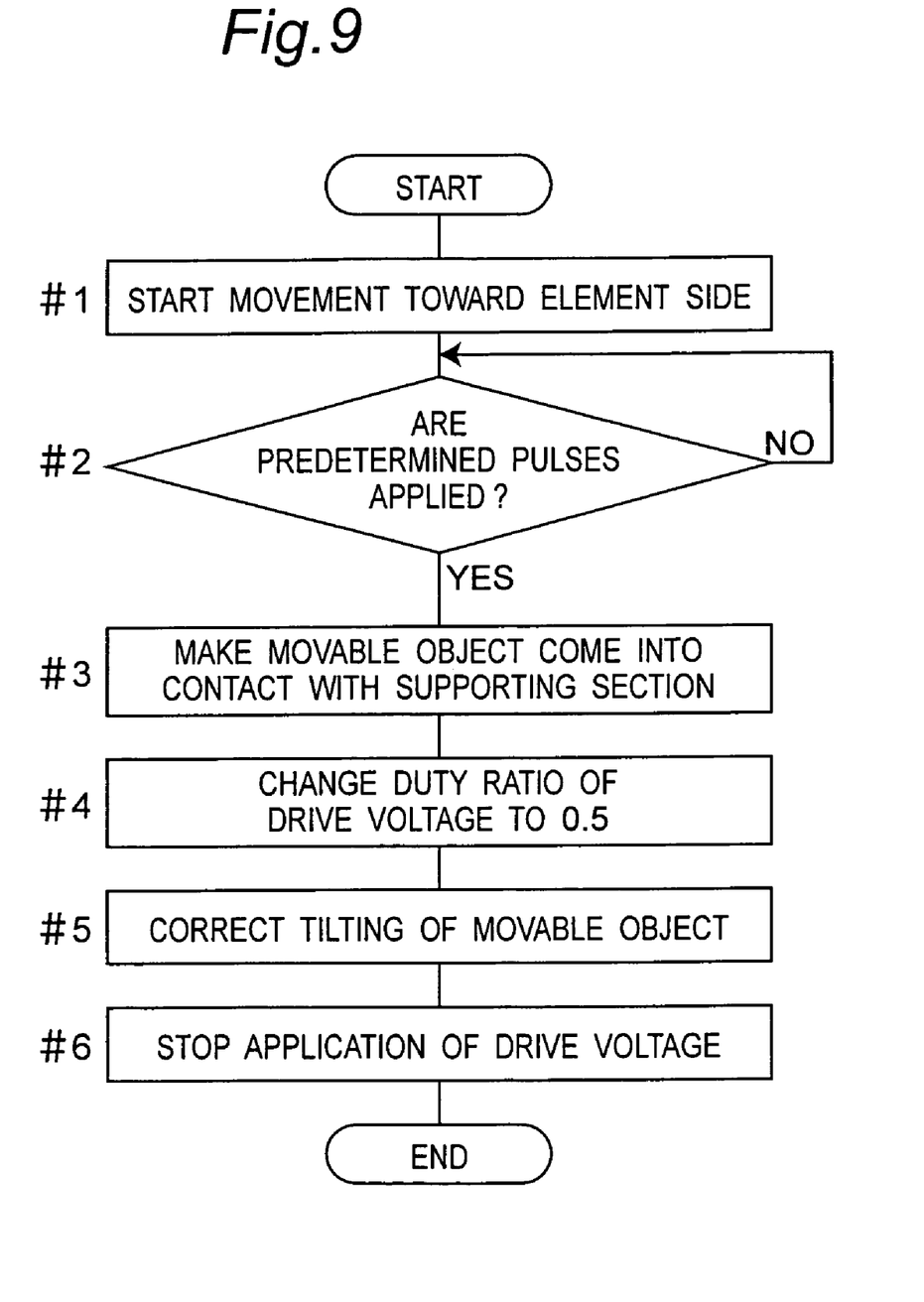
FIG. 9 is a flowchart showing processing for detecting a origin of the drive unit shown in FIG. 5A.
Figure 10A:
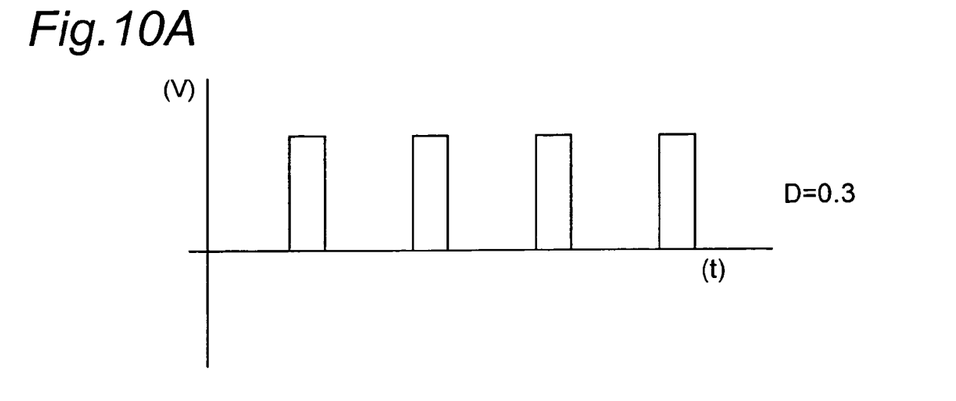
FIG. 10A is a view showing the waveform of the drive voltage having a duty ratio of 0.3, as an example of the first wave drive signal.

FIG. 9 is a flowchart showing origin detection processing for detecting the position of the movable object 30. First, for the purpose of detecting the origin of the movable object, a predetermined first wave drive voltage having a rectangular waveform and having a duty ratio in the range of 0 to 0.5 is applied to the piezoelectric element 24 to move the movable object 30 toward the element side (at step #1). FIG. 10A is a view showing the waveform of the drive voltage having a duty ratio of 0.3, as an example of the first wave drive signal. In the processing being carried out at this time, pulses are applied to the piezoelectric element 24 a predetermined number of times stored beforehand in the control section 34 (at step #2), regardless of the position of the movable object 30 on the rod 25. The predetermined time during which the pulses are applied is a time during which the movement amount that allows the movable object to make contact with the supporting section 22 can be obtained securely, regardless of the position of the movable object 30 in the movable range. The specific value of the time has been set beforehand depending on the length of the rod 25, the displacement amount of the piezoelectric element 24, and the like. In this embodiment, the drive voltage to be applied at this time is applied for 470 msec.

Because the drive voltage is applied to the piezoelectric element 24 at the above-mentioned step, the movable object 30 can be made contact with the supporting section 22 on the side of the piezoelectric element, regardless of the position of the movable object at the time of the start of the processing (at step #3). In the case that the movable object 30 is located in an intermediate position in the movable range before the start of the processing, there is a case in which the piezoelectric element 24 is driven by this operation although the movable object 30 is in contact with the supporting section 22. In this case, the tilting of the movable object 30 may occur.

Figure 10B:
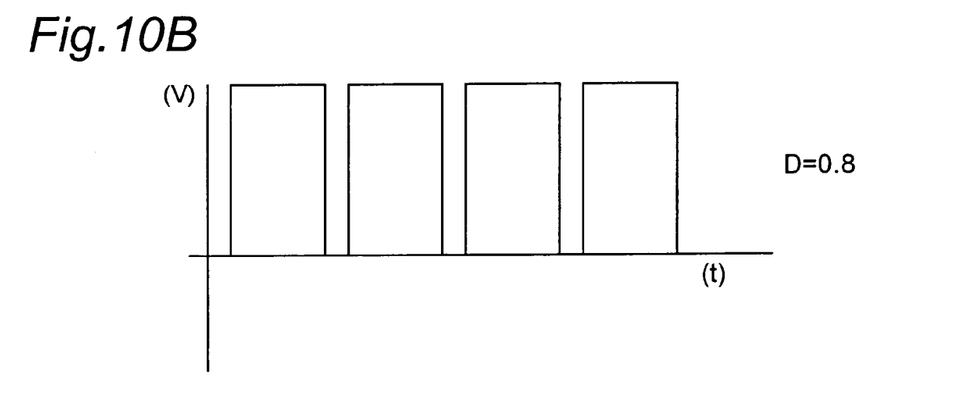
FIG. 10B is a view showing the waveform of the drive voltage having a duty ratio of 0.8, as an example of the second wave drive signal.

Next, after the application of the pulses for the predetermined time is completed, the control section 34 changes the duty ratio of the drive voltage (at step #4), and the drive voltage is applied to the piezoelectric element 24 for a predetermined time. The duty ratio is changed so that the drive voltage has a waveform for moving the movable object 30 toward the tip side. Furthermore, the drive voltage at this time may be a drive voltage that moves the movable object 30 at a movement speed lower than the movement speed obtained at the previous step. For example, when it is assumed that the duty ratio of the drive voltage that is applied to move the movable object 30 toward the piezoelectric element 24 at the previous step 1 is 0.3, it is possible to set the duty ratio of the drive voltage to be applied at step 4 to appropriately 0.8. FIG. 10B is a view showing the waveform of the drive voltage having a duty ratio of 0.8, as an example of the second wave drive signal.

On the other hand, the drive voltage to be applied at step 4 may be a drive voltage that moves the movable object 30 at the same movement speed as the movement speed obtained at the previous step. For example, when it is assumed that the duty ratio of the drive voltage that is applied to move the movable object 30 toward the piezoelectric element 24 at the previous step 1 is 0.3, it is also possible to set the duty ratio of the drive voltage to be applied at step 4 to appropriately 0.7. With this control, the control section may only generate drive voltages having fewer kinds of duty ratios depending on the movement direction of the movable object, whereby the control can be simplified.

It is preferable that the application time of the drive voltage to be applied at step 4 may be a short time during which the movable object 30 is not moved substantially, that is, appropriately 1 to 10 msec. In this embodiment, the application time is set to 5 msec. Hence, by virtue of this processing, the piezoelectric element 24 can vibrate without changing the position of the movable object 30, and the tilting of the movable object 30 can be corrected by the urging force exerted to the movable object 30 (at step #5).

Then, the application of the drive voltage to the piezoelectric element 24 is stopped (at step #6), and the processing is completed.

As described above, with the drive unit according to the present invention, the operation for detecting the origin of the movable object can be carried out easily and securely without providing auxiliary devices, such as a sensor. In addition, the tilting of the movable object, caused when the movable object is made contact with the supporting section 22 for origin detection, can be corrected by carrying out simple processing.

The present invention is not limited to the embodiment described above, but the present invention can be implemented using other various embodiments. For example, the embodiment described above is configured so that, for the purpose of moving the movable object to a limit position in the movable range, the drive voltage, the duty ratio of which is changed, is applied only when the positional detection is carried out on the side of the piezoelectric element, whereby the tilting is corrected.

However, this processing may be carried out on both ends of the movable range. In other words, by the use of this processing instead of providing the sensor 23a, the tilting of the movable object, caused by the contact, can also be corrected at the supporting section on the tip side.

Figure 10C:
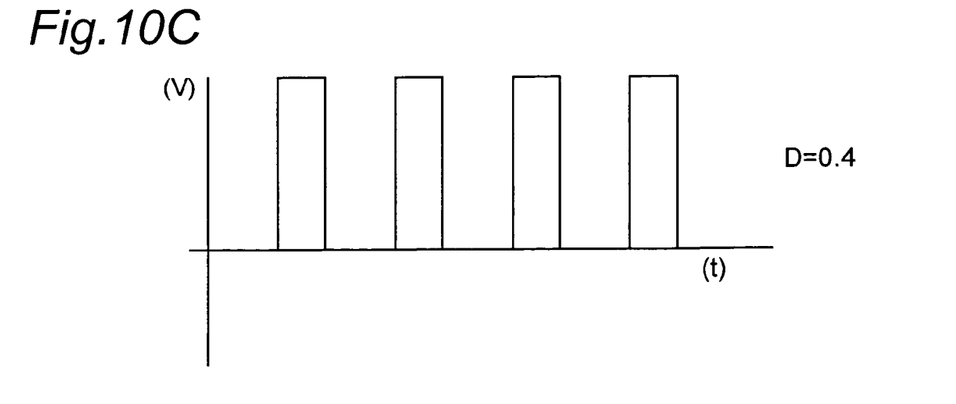
FIG. 10C is a view showing the waveform of the drive voltage having a duty ratio of 0.4, as an example of the third wave drive signal.

Besides, it may be possible that, after the second wave drive signal for moving the movable object in a direction of movement away from the restricting member is applied, a third wave drive signal is applied to move the movable object close to the restricting member. More specifically, in the above-mentioned embodiment, a rectangular wave voltage having a duty ratio larger than 0 and less than 0.5, for example, a rectangular wave voltage having a duty ratio of 0.4, is taken as an example (see FIG. 10C). In the case that a clearance occurs between the movable object and the restricting member by the application of the second wave drive signal, this clearance can be reduced by applying the third wave drive signal. At this time, it is preferable that the time during which the third wave drive signal for moving the movable object close to the restricting member is applied may be shorter than the time during which the second wave drive signal is applied. More specifically, the application time of the third wave drive signal can be appropriately 0.5 to 0.8 times the application time of the second wave drive signal.

In addition, both the control for making the movable object come into contact with the supporting section and the control for correcting the tilting of the movable object in the embodiment described above are carried out by changing the application time of the drive voltage, but may be carried out by changing the number of pulses of the drive voltage.

Moreover, although the drive unit is configured so that the lens used in the lens barrel of a camera is moved, the drive unit is not limited to this configuration.

For example, the drive unit can also be used as an actuator for driving a lens used in an MD drive, a CD drive, a DVD drive or the like.

Still further, the supporting member is not limited to have a rod shape, but may have a plate shape, for example. Moreover, although the movable object and the supporting member in the embodiment described above are moved relatively by abruptly moving the supporting member, a mechanism that cancels the urging force exerted from the movable object to the supporting member may be provided when the movable object is moved relatively with respect to the supporting member.

By appropriate combination of any of the various embodiments described above, the effects of the respective embodiments can be produced.

The entire disclosure of Japanese Patent Application No. 2005-235825 filed on Aug. 16, 2005, including specification, claims, drawings, and abstract are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A drive unit comprising:
   an electromechanical transducer capable of expanding/contracting by drive signal application,
   a supporting member that is connected to said electromechanical transducer and displaced together with said electromechanical transducer,
   a movable object that is slidably supported on said supporting member and moves along said supporting member owing to a vibration of said supporting member by virtue of the expansion/contraction of said electromechanical transducer,
   a restricting member that restricts a movable range of said movable object, and
   a drive circuit that applies to said electromechanical transducer a first wave drive signal for vibrating said supporting member so that a difference occurs between the expansion and contraction of said supporting member when said movable object is moved to a position where said movable object makes contact with said restricting member, and applies to said electromechanical transducer a second wave drive signal for vibrating said supporting member so that said movable object is moved in a direction of movement away from said restricting member to the extent that said movable object is not detached from said restricting member after said movable object makes contact with said restricting member, and then stops the applications of said drive signals.

2. The drive unit according to claim 1, wherein said drive circuit applies said first wave drive signal for a constant time sufficient to allow said movable object to make contact with said restricting member, regardless of a position of said movable object before a start of the movement.

3. The drive unit according to claim 1, wherein said drive circuit applies said second wave drive signal for 1 to 10 msec.

4. The drive unit according to claim 1, wherein said second wave drive signal is a drive signal that moves said movable object at a speed lower than a movement speed of said movable object obtained applying said first wave drive signal.

5. The drive unit according to claim 1, wherein said second wave drive signal is a drive signal that moves said movable object at the same speed as a movement speed of said movable object obtained applying said first wave drive signal.

6. The drive unit according to claim 1, wherein said restricting member is provided at a reference position, on the basis of which a position of said movable object of said drive unit is detected.

7. A drive unit comprising:
   an electromechanical transducer capable of expanding/contracting by drive signal application,
   a supporting member that is secured to an end of said electromechanical transducer in the expansion/contraction direction thereof,
   a movable object slidably supported on said supporting member,
   an urging member that exerts an urging force to urge said movable object toward said supporting member,
   a restricting member provided to make contact with said movable object at an end of a movable range of said movable object, and
   a drive circuit that applies to said electromechanical transducer a first wave drive signal for vibrating said supporting member so that said movable object moves toward said restricting member when said movable object is moved to a position where said movable object makes contact with said restricting member, and applies to said electromechanical transducer a second wave drive signal for vibrating said supporting member so that said movable object is moved in a direction of movement away from said restricting member to the extent that said movable object is not detached from said restricting member after said movable object makes contact with said restricting member, and then stops the applications of said drive signals.

8. The drive unit according to claim 7, wherein said drive circuit applies said first wave drive signal for a constant time sufficient to allow said movable object to make contact with said restricting member, regardless of a position of said movable object before a start of the movement.

9. The drive unit according to claim 7, wherein said second wave drive signal is a drive signal that moves said movable object at a speed lower than a movement speed of said movable object obtained applying said first wave drive signal.

10. The drive unit according to claim 7, wherein said second wave drive signal is a drive signal that moves said movable object at the same speed as a movement speed of said movable object obtained applying said first wave drive signal.

11. The drive unit according to claim 7, wherein said restricting member is provided at a reference position, on basis of which a position of said movable object of said drive unit is detected.

12. The drive unit according to claim 7, wherein said supporting member has a rod shape.

13. The drive unit according to claim 7, wherein a length of said supporting member is greater than the movable range of said movable object.

14. The drive unit according to claim 7, wherein first and second waves of said first and second wave drive signals are rectangular waves.

15. The drive unit according to claim 14, wherein said first and second waves have different duty ratios.

16. The drive unit according to claim 7, wherein, after said second wave drive signal is applied to said electromechanical transducer, said drive circuit applies a third wave drive signal for vibrating said supporting member so that said movable object moves toward said restricting member, and then stops the applications of said drive signals.

17. The drive unit according to claim 16, wherein, a time during which said third wave drive signal is applied is shorter than a time during which said second wave drive signal is applied.

* * * * *